(12) United States Patent
Le Floch et al.

(10) Patent No.: US 8,126,049 B2
(45) Date of Patent: Feb. 28, 2012

(54) METHOD AND A DEVICE FOR TRANSMITTING IMAGES

(75) Inventors: Hervé Le Floch, Rennes (FR); Eric Nassor, Thorigne Fouillard (FR)

(73) Assignee: Canon Kabushiki Kaisha, Tokyo (JP)

( * ) Notice: Subject to any disclaimer, the term of this patent is extended or adjusted under 35 U.S.C. 154(b) by 930 days.

(21) Appl. No.: 12/137,975

(22) Filed: Jun. 12, 2008

(65) Prior Publication Data

US 2008/0317117 A1      Dec. 25, 2008

(30) Foreign Application Priority Data

Jun. 21, 2007    (FR) ...................................... 07 55941

(51) Int. Cl.
*H04N 7/12*     (2006.01)
*H04N 11/02*    (2006.01)
*H04J 1/16*     (2006.01)

(52) U.S. Cl. ............... 375/240.02; 375/240.26; 370/230; 370/465

(58) Field of Classification Search ........................ None
See application file for complete search history.

(56) References Cited

U.S. PATENT DOCUMENTS

| | | | |
|---|---|---|---|
| 6,014,694 A * | 1/2000 | Aharoni et al. ............... 709/219 |
| 7,457,820 B1 | 11/2008 | Viger et al. ............... 707/103 R |
| 7,961,618 B1 * | 6/2011 | Prasad et al. ................... 370/235 |
| 2001/0024470 A1 * | 9/2001 | Radha et al. ............... 375/240.1 |
| 2002/0010938 A1 * | 1/2002 | Zhang et al. ..................... 725/95 |
| 2004/0190515 A1 | 9/2004 | Nogima et al. ............... 370/392 |
| 2006/0053207 A1 | 3/2006 | Labelle et al. ............... 709/206 |
| 2008/0225842 A1 * | 9/2008 | Goldfein et al. ............... 370/389 |

FOREIGN PATENT DOCUMENTS

| | | |
|---|---|---|
| FR | 2 811 098 | 1/2002 |
| WO | WO 99/00984 | 1/1999 |
| WO | WO 2006/047324 | 5/2006 |

* cited by examiner

*Primary Examiner* — Kevin C Harper
*Assistant Examiner* — Cassandra Decker
(74) *Attorney, Agent, or Firm* — Fitzpatrick, Cella, Harper & Scinto (57) ABSTRACT

The method of transmission of a datastream representing a sequence of images over a network in which the quantity of information that may be sent per unit of time varies substantially cyclically, said transmission extending over a plurality of cycles, comprises:

a step (805 to 807, 809, 810) of determining times for which the quantity of information that may be sent per unit of time over the network is greater, and respectively less, than its average, on the basis of the substantially cyclical past variation in said quantity of information and a step (801 to 805, 812 to 816) of sending over said network, at said times, images corresponding to a greater, and respectively smaller, quantity of information than the average of the images.

During the determining step, a period of cyclical variation of the quantity of information that may be sent over the network is determined.

12 Claims, 11 Drawing Sheets

METHOD AND A DEVICE FOR TRANSMITTING IMAGES

The present invention concerns a method and a device for transmitting images. It applies, in particular, to the transmission of a video over a network at variable rate.

Due to the variable network bandwidth, the images of a compressed video transmitted over a network may arrive at irregular intervals of time. On account of this, the images are sometimes displayed with temporal shifts liable to give rise to an unpleasant visual effect: an unpleasant impression of jerkiness is perceived. Furthermore, the management of the CPU resources and memory of the client is easier when the images arrive at a regular interval.

Some images of a compressed video have (for the same visual quality) very different sizes. INTRA images are classic examples in the context of an MPEG type video compression. INTRA images do not use the temporal prediction module (motion estimation by block matching). INTRA images are more difficult to compress and their size is generally 4 to 5 times the size of an INTER image (for the same visual quality). If the bandwidth is too low to ensure the transmission of such an image during the time interval between two images, there is a risk of late arrival of an INTRA image at the client. On account of this, an unpleasant visual effect may occur.

A means for solving this problem is to possess a buffer memory large enough at the recipient so as to take up possible transmission delays. However, some clients/recipients do not possess a buffer memory of sufficient size to store the data of images prior to their display. Even if a recipient possesses a sufficient buffer memory, events may occur that empty that buffer memory, such as a temporary interruption of the sending of the data by the server. The jerky effect then occurs.

Furthermore, in the case of a transmission system of very small lag, for example for video conferencing, the use of a buffer memory is not appropriate because it necessarily introduces lag, that is to say a delay between the reception of the information representing the image and its display after decoding.

The present invention aims to mitigate these drawbacks.

In general terms, the present invention makes it possible to synchronize the sending of the heaviest images of the video (typically the INTRA images) with times for which the quantity of information sent according to the network protocol (for example TCP or TFRC) is greatest.

To that end, according to a first aspect, the present invention concerns a method of transmission of a datastream representing a sequence of images over a network in which the quantity of information that may be sent per unit of time varies substantially cyclically, said transmission extending over a plurality of cycles, that comprises:
- a step of determining times for which the quantity of information that may be sent per unit of time over the network is greater than its average, on the basis of the substantially cyclical past variation in said quantity of information and
- a step of sending over said network, at said times, images corresponding to a greater quantity of information than the average of the images.

According to a second aspect, the present invention concerns a method of transmission of a datastream representing a sequence of images over a network in which the quantity of information that may be sent per unit of time varies substantially cyclically, said transmission extending over a plurality of cycles, that comprises:
- a step of determining times for which the quantity of information that may be sent per unit of time over the network is less than its average, on the basis of the substantially cyclical past variation in said quantity of information and
- a step of sending over said network, at said times, images corresponding to a smaller quantity of information than the average of the images.

By virtue of each of these provisions, the risk of "jitter" (offset between the theoretical display time and the real display time) that may occur at the client is limited. The quality of the videos transmitted is thus improved overall.

According to particular features, during the determining step, a period of cyclical variation of the quantity of information that may be sent over the network is determined.

According to particular features, during the determining step, extrema of information quantity that may be sent over the network are determined.

By virtue of each of these provisions, the determination of the period of substantially cyclical variation is automatic and adaptive.

According to particular features, during the determining step, a quantity of information is determined that is kept in a memory and that remains to be transmitted over the network.

According to particular features, during the step of sending images, an image to code is selected with a compression rate lower than the compression rate of the images surrounding it, the transmission of the images being carried out in their chronological order, such that the transmission of the coded image, over the network, corresponds to a time for which the quantity of information that may be sent per unit of time over the network is greatest.

According to particular features, during the sending step, a step is carried out of coding at least one image with a plurality of coding modes representing the same image by different quantities of information.

According to particular features, during the sending step, a step is carried out of coding the same succession of a plurality of images into a plurality of bitstreams, each bitstream representing that succession of images with a specific image which is represented with a coding mode representing a lower compression rate than the other images of said succession of images.

According to particular features, during the sending step, the bitstream is transmitted for which the specific image corresponds to a time for which the quantity of information that may be sent per unit of time over the network is greatest.

According to particular features, during the sending step, for each image of a plurality of images, the position is determined, in time, of its transmission over the network in case that single image is coded with a coding mode of lower compression rate than the other images of said plurality of images and the image is selected for which said position corresponds to a time for which the quantity of information that may be sent per unit of time over the network is greatest, in order for the selected image to be coded with said coding mode of least compression rate.

According to particular features, during the sending step, that image of the plurality of images which must be coded with a coding mode of lower compression rate than the other images of said plurality of images is estimated and a plurality of bitstreams is constituted taking that image into account.

By virtue of these provisions, the ease of implementation and efficacy of the method of each of the first two aspects of the present invention is increased.

According to a third aspect, the present invention concerns a device for transmission of a datastream representing a sequence of images over a network in which the quantity of information that may be sent per unit of time varies substantially cyclically, said transmission extending over a plurality of cycles, that comprises:
- a means for determining times for which the quantity of information that may be sent per unit of time over the network is greater than its average, on the basis of the substantially cyclical past variation in said quantity of information and
- a means for sending over said network, at said times, images corresponding to a greater quantity of information than the average of the images.

According to a fourth aspect, the present invention concerns a device for transmission of a datastream representing a sequence of images over a network in which the quantity of information that may be sent per unit of time varies substantially cyclically, said transmission extending over a plurality of cycles, that comprises:
- a means for determining times for which the quantity of information that may be sent per unit of time over the network is less than its average, on the basis of the substantially cyclical past variation in said quantity of information and
- a means for sending over said network, at said times, images corresponding to a smaller quantity of information than the average of the images.

According to a fifth aspect, the present invention concerns a computer program loadable into a computer system, said program containing instructions enabling the implementation of the method of transmitting images as succinctly set forth above.

According to a fifth aspect, the present invention concerns an information carrier readable by a computer or a microprocessor, removable or not, storing instructions of a computer program, characterized in that it enables the implementation of the method of transmitting images as succinctly set forth above.

As the advantages, objects and features of these devices, of this program and of this information carrier are similar to those of the methods of transmitting images of the present invention, as succinctly set forth above, they are not reviewed here.

Other advantages, objects and features of the present invention will emerge from the following description, given, with an explanatory purpose that is in no way limiting, with respect to the accompanying drawings, in which.

In the whole of the description, a set of successive digital images represented by a signal is referred to as "a video". In the whole of the description, the transmission of data over a network is referred to as "flow". In the whole of the description, the function of forming packets, in terms of the transmission of information, from a bitstream, it referred to as "packetization", "depacketization" being the symmetrical function.

In the whole of the description, embodiments of the present invention are described in which images are sent over the network which correspond to a greater quantity of information than the average of the images, at the times for which the quantity of information that may be sent per unit of time over the network is greater than its average.

As the implementation of the embodiments of the present invention in which images are sent over a network that correspond to a smaller quantity of information than the average of the images, at the times for which the quantity of information that may be sent per unit of time over the network is less than its average is trivial for the person skilled in the art on reading the following description, it will not be described below.

Figure 1:
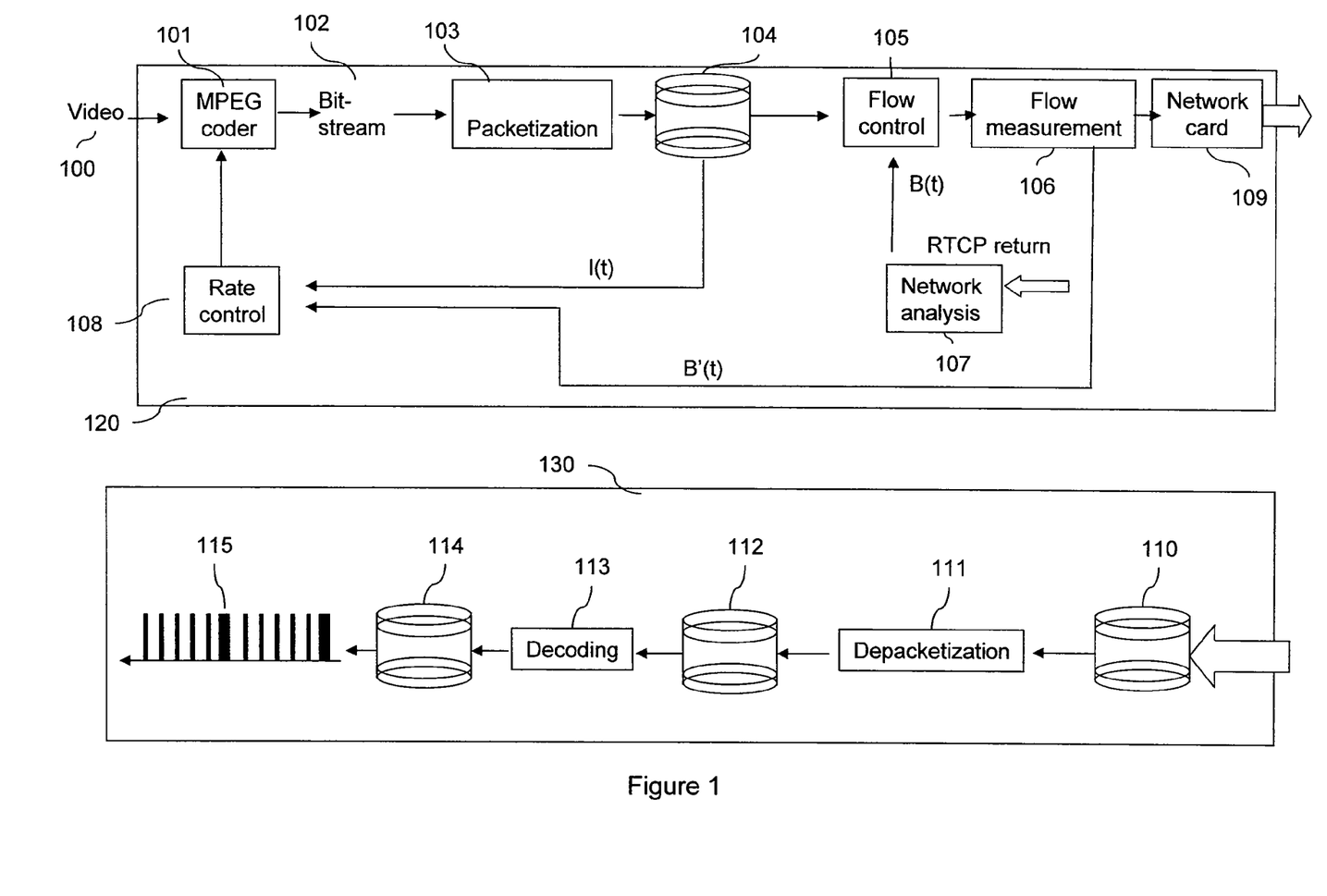
FIG. 1 is a diagrammatic representation of an application of the present invention.

A video 100 can be seen in FIG. 1, which is acquired in order to be transmitted, by a sender terminal 120 and displayed on a screen 1104 (see FIG. 10) of a client terminal 130.

The transport of the information representing the video, over the network (not represented), may be carried out in different manners:
- The TCP protocol may be used, which integrates a congestion control of AIMD type (AIMD being the acronym for "Additive increase Multiplicative Decrease")
- video transport over RTP may be used (RTP being the acronym for "Real-Time transport protocol"), if a congestion control algorithm is implemented above RTP. In this case, specific information may be added into the RTP messages and specific messages may be sent over RTCP (acronym for "RTP control protocol") which is the control part of RTP. Different congestion control algorithms may be implemented, for example AIMD or TFRC,
- transport of video over DCCP may be used (DCCP being the acronym for "Datagram Congestion Control Protocol") which is a protocol making it possible to have several types of congestion control, for example AIMD and TFRC.

The video is first of all compressed, by a coder 101, for example in accordance with an MPEG standard (MPEG being the acronym for "moving picture experts group"), to form a bitstream 102. The bitstream 102 is divided into packets, by a function 103 referred to as "packetization". The packets are stored in a buffer memory or "buffer" 104.

Simultaneously, in a closed loop control, the flow of packets is measured by a function 106 and the network is analyzed by a function 107 which actuates a flow control module 105, in order to limit the flow of the packets to a network card 109.

The module 108 adapts the compression rate of the video compression algorithm 101 in order for the bitstream obtained to conform to the transmission capacities of the network.

The flow of packets occurs according to the estimated delays and losses between the server 120 and the client 130. Thus, the flow of the packets occurs more rapidly when the losses are nil or low and when the transmission delays are short. In case of packet loss, the flow speed is reduced. When the number of packets sent in a given period of time increases, the protocol considers that the bandwidth available on the network is greater. The flow control module 105 is also referred to as the "congestion control" module. The speed of flow of the packets at the output of the flow control module 105 may be assimilated to a bandwidth of the network estimated by that module 105. In the context of congestion control over RTP, the RTCP packets sent back by the client 130 are analyzed to deduce therefrom a flow speed of the packets and thus a bandwidth.

In the context of the transmission of data over an IP network (IP being the acronym for "Internet Protocol"), rate control protocols (also termed congestion control algorithm) are used to avoid the congestion of the network. These protocols limit the sending of data over the network. Protocols that are known are for example TCP (acronym for "transmission control protocol") or TFRC (acronym for "TCP friendly rate control"). These protocols makes it possible to send more data when losses are low and the transmission delays are short and limit the sending of data when losses appear or the transmission delays increase. This protocols generally operate by increasing the quantity of information transmitted until a loss is noted which leads to a division of the bandwidth. These protocols may behave in a stationary manner. In this case, it is possible to predict the times for which the quantity of information sent will be high.

At the client 130, the packets sent are received by a reception buffer memory. The packets received are then transformed to reconstitute the compressed video bitstream, by a "depacketization" function 111 and a buffer memory 112, before being decompressed by a decoding function 113, placed in buffer memory 114 and displayed on the basis of an output signal 115.

The output signal 115 represents the different images of the video to display over time. In the representation of the signals used in the drawings, the wide lines diagrammatically represent INTRA images and the fine lines represent INTER images.

The client 130 sends information back to the server 120 in order for the server 120 to regulate the transmission of the packets over the network, via its functions 105, 106 and 107.

These sent back packets are the RTCP packets, in the case of RTP implementation, and ARQ packets (ARQ being the acronym for "Automatic Repeat-reQuest") in the case of implementation of TCP or DCCP.

It is assumed here that the video is processed by the client 130 in real time. As soon as the information representing an image arrives, it is processed, by the functions 111 and 113 in order to be displayed. In this manner, the delays between the display of the image and its acquisition are reduced to a minimum.

Figure 2:
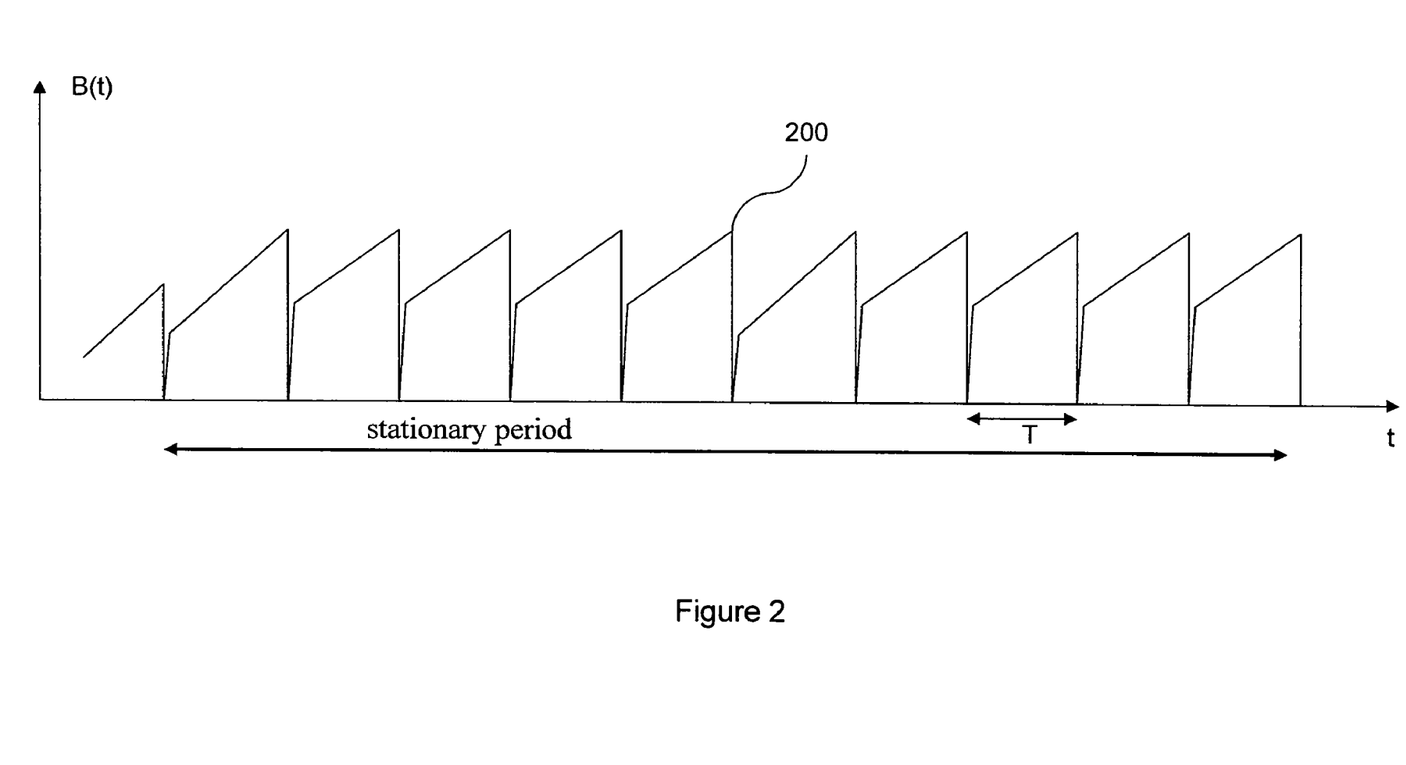
FIG. 2 is a diagrammatic representation of a cyclical bandwidth.

FIG. 2 shows an example of behavior of the flow module 105. This FIG. 2 crudely represents the behavior of an algorithm of TCP type. However, the invention also applies, among others, to any type of rate congestion control module which has a pseudo-periodic behavior in stationary mode. In the example represented, the estimated instantaneous bandwidth B(t), 200, is displayed as a function of time t. As specified earlier, the instantaneous bandwidth will be assimilated to the number of packets that have flowed in a given time interval. The bandwidth increases additively and decreases abruptly at relatively regular intervals of time. The increase occurs when the server 120 notes no packet transmission errors: it then tests the sending of packets at a higher rate. The server 120 causes the rate of packets by time interval to decrease when losses or delays are noted. If the network is stable, the behavior of the bandwidth 200 may become relatively stationary over a certain interval of time.

The totally periodic behavior presented in the Figure only occurs, for TCP, in the case in which the TCP flow occurs in the presence of UDP flow without congestion control.

If the available bandwidth is denoted by B, the size of a packet by P, and the time of communication outward and back between the server and the client by Rtt, then the period T is given by the formula:

$$T=B*Rtt^2/2*P.$$

Where several TCP flows occur in competition on the network, each of the servers attempts to increase its bandwidth additively until an error occurs when the network deletes a packet, randomly. The probability of error for a flow is thus linked to the proportion of the bandwidth occupied. To evaluate this probability for a flow, it is possible, for example, to measure the average bandwidth occupied Bav over several preceding cycles and compare it to the current bandwidth Bcurr. As a first approximation, it may be considered that the probability of having an error, and thus a drop in the bandwidth, is greater if Bcurr>Bav.

Assuming the number of TCP flows is constant, the probability of error Pr over a short length of time t may be approximated more precisely for example with the formula:

$$Pr=Bcurr*2*P*t/Bav^2*Rtt^2$$

The present invention uses these periods in which a certain stationarity is detected.

Figure 3:
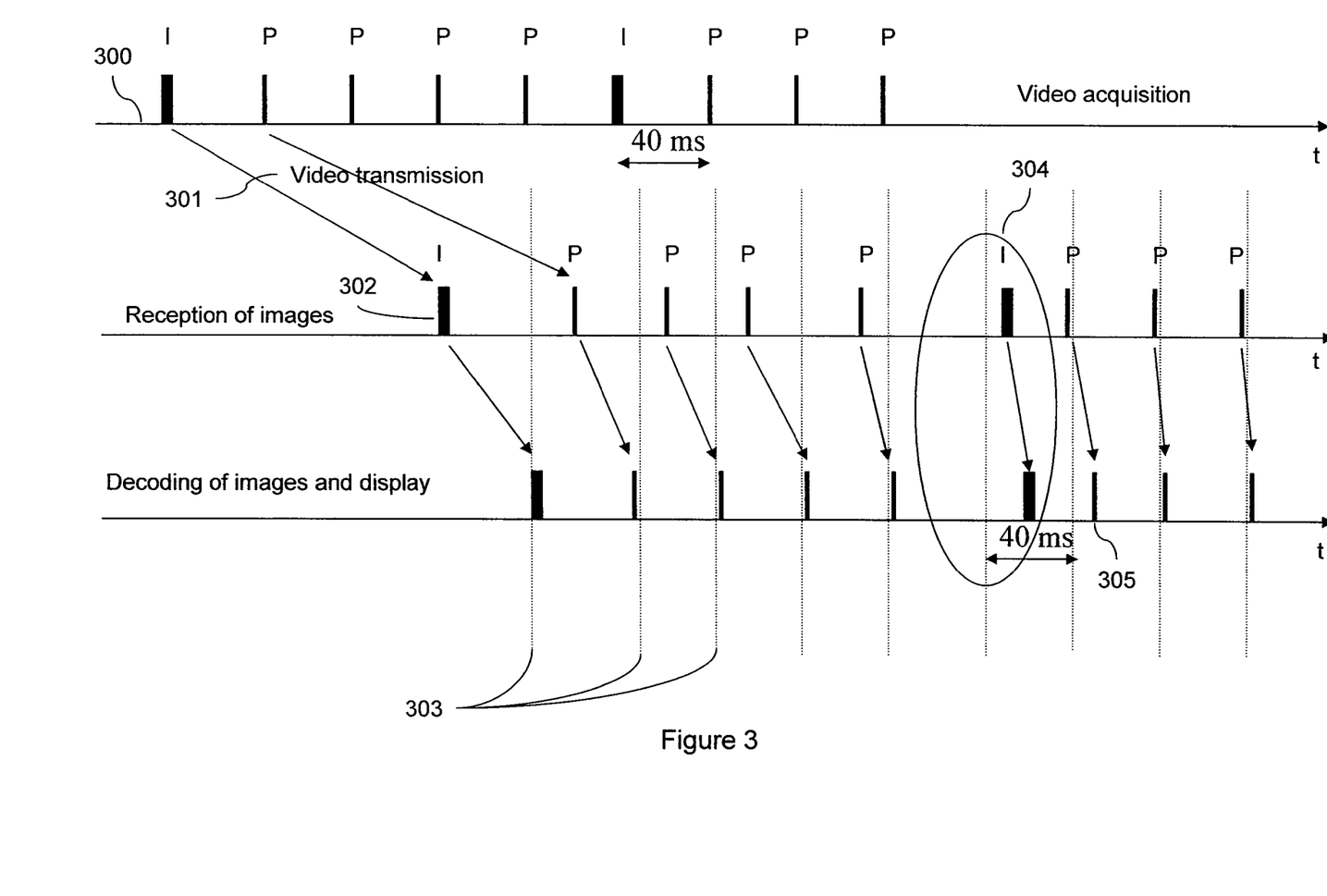
FIG. 3 is a diagrammatic illustration, in signal form, of a problem which the present invention aims to solve.

FIG. 3 illustrates the problem of the transmission and the synchronization of the images of the video at the time of reception. On a line 300, the acquisition of the images of a video has been represented along a temporal axis. The bold lines represent the images which will be compressed in INTRA mode, and the fine lines represent the images which will be compressed in INTER mode. In this example, the images are acquired every 40 ms. After compression and packetization, the images are transmitted one after the other, as represented at 301. The images when received by the client 130, have been represented symbolically on a line 302, on a temporal axis. The dotted lines 303 represent the theoretical display times of the images. It can be seen that the images must be received sufficiently early, before the display time, such that, after depacketization and decompression, they can be displayed at the theoretical time. An INTRA image can be seen at 304 which arrives with a certain delay, preventing its display on time. As this image arrives late, the resources of the client are mobilized and the decoding of the following INTER image, which nevertheless arrives on time, cannot be done sufficiently early, as illustrated in the Figure at 305, in order for it to be displayed at the corresponding theoretical time.

Figure 4:
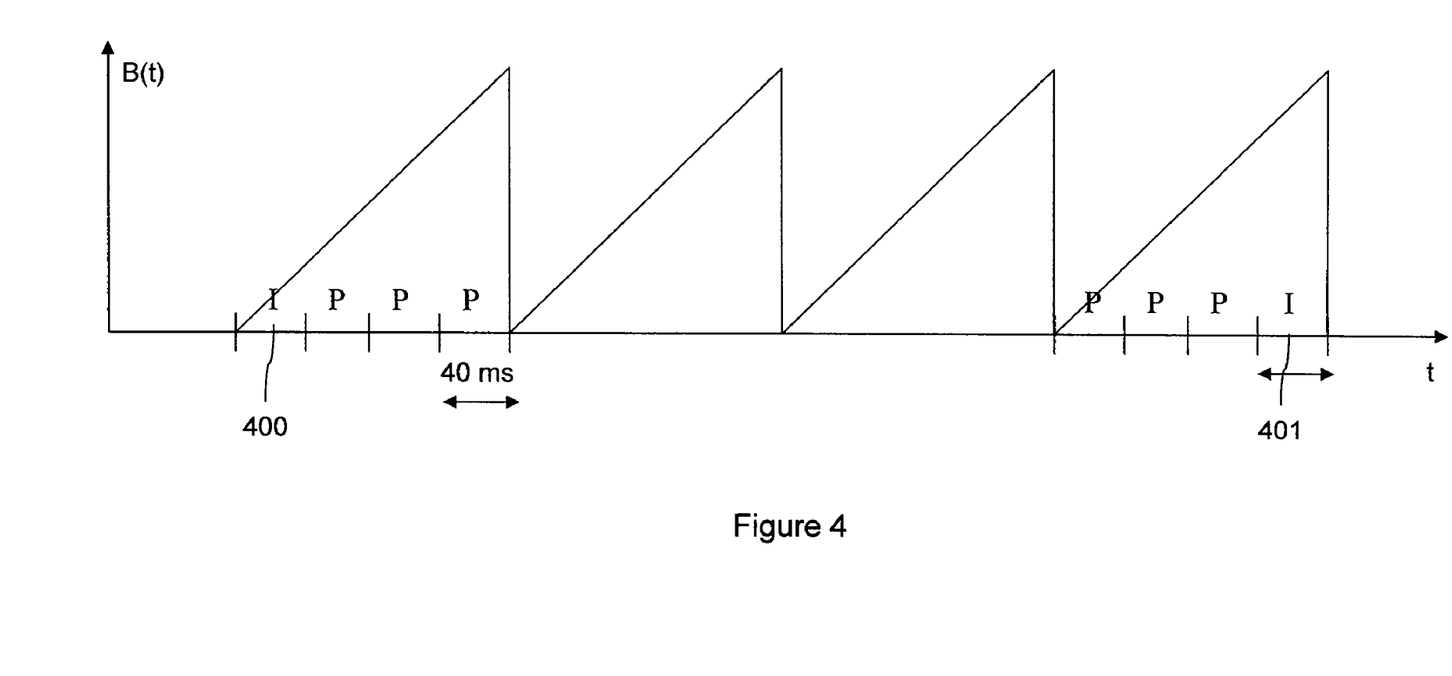
FIG. 4 is a diagrammatic representation, in signal form, of different cases of image transmission over a network.

FIG. 4 illustrates another problem linked to the protocols of TCP or TFRC type. In FIG. 4, the behavior of a protocol of this kind has been represented diagrammatically. The bandwidth B(t) corresponding to the number of packets sent is represented as a function of time t. It is noted that the bandwidth B(t) increases so long as no packet loss is detected, then drops when a loss is detected, for example by the server 120. As the time interval between two images is 40 ms in this example, the compressed image must be sent during that time interval. For the first INTRA image 400, as the available bandwidth is low, that image must be strongly compressed to be sent sufficiently quickly. Furthermore, due to the fact that an INTRA image is less efficiently compressed, the low bandwidth doubly penalizes the quality of that image.

Still in this example, at 401, the INTRA image is transmitted at the time at which the bandwidth is at its maximum. On account of this, the compression rate is less and the quality of the image sent is higher.

In this example, the quality of the transmitted images is liable to vary greatly since some images must be very highly compressed and others much less. The resulting visual impression is thus unpleasant since the image quality varies strongly from one moment to another.

In the following portion of the description, a method is set out to mitigate the problems set out in the preceding Figures (display delay, high variation in the quality of the images at two different times).

This method is particularly applicable when the length of time between two images is relatively low relative to the duration of an oscillation of the congestion control algorithm. As stated in the description of FIG. 2, the duration of oscillation depends on the bandwidth of the network. In practice, with the recent broadband networks (operating at 100 Mb/s and above), the period of a flow, TCP for example, becomes high with respect to the length of time between two images of a video. For example, with a rate of 100 Mb/s, an RTT of 10 ms and with a packet size of 1500 bytes, a period of 0.5 seconds is obtained if the video is at 60 frames per second, the length of time between two images is 17 ms, which is low relative to the period of oscillation.

Figure 5:
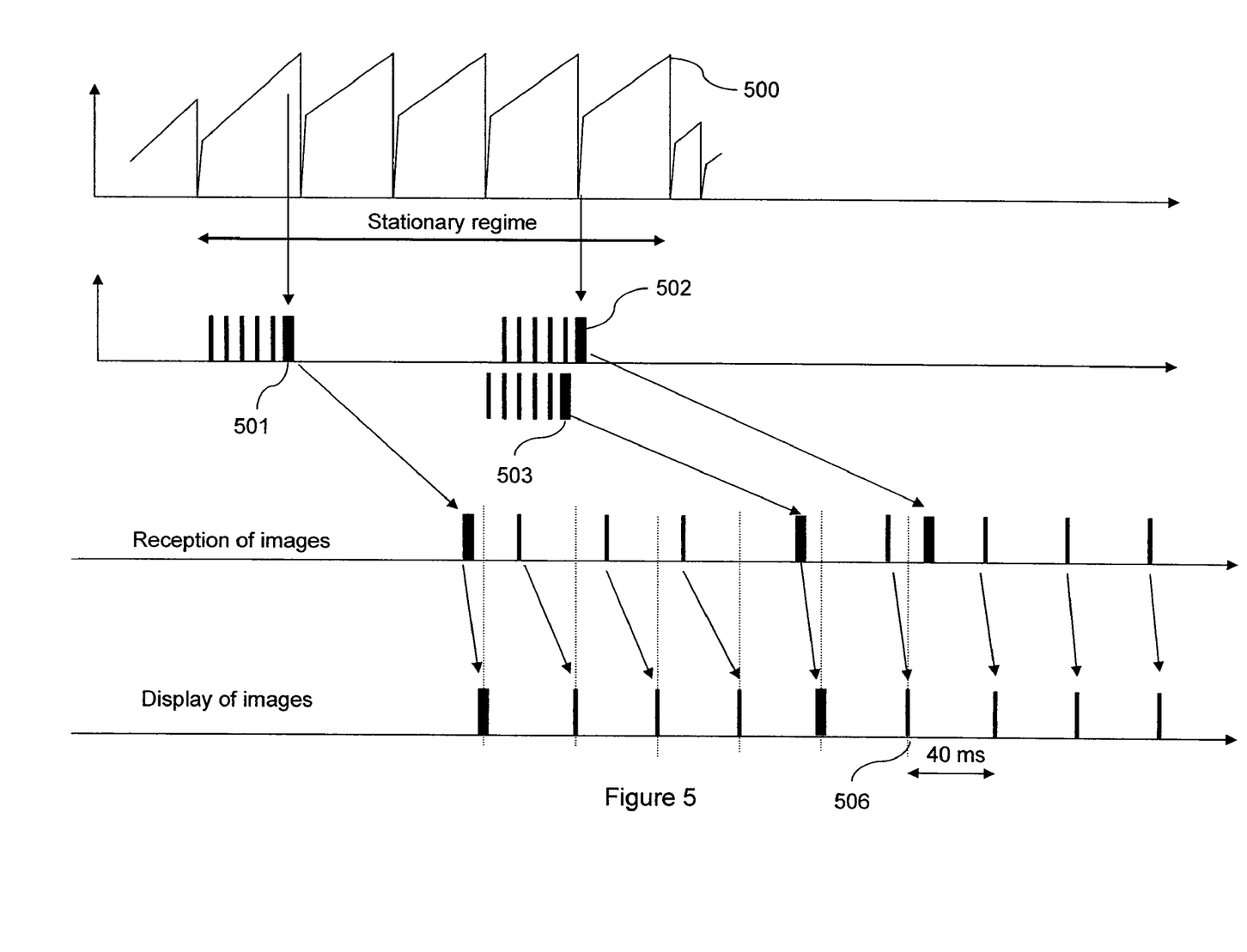
FIG. 5 is a diagrammatic representation, in signal form, of an effect of the implementation of the present invention.

FIG. 5 describes, in signal form, effects of the implementation of the present invention. The objective is to synchronize the sending of the images represented by a greater quantity of information with times at which the bandwidth is the highest. In embodiments, to achieve this objective, the following main steps are carried out:

detecting a stationary regime of evolution of the bandwidth, predicting peaks of the bandwidth and modifying compression times of the images of a video in INTRA mode such that their transmissions correspond to the peaks of the bandwidth.

These steps are illustrated in FIG. 5, by their relationships with the signals and bandwidths implemented. The curve 500 represents a stationary regime of the bandwidth. The period T of this regime is measurable and the peaks of the bandwidth are thus predictable. In the second row, the coded video is represented symbolically in thicker line for the images coded in INTRA mode. It can be noted that, at the time 501, the image coded in INTRA mode by the video coder is sent substantially at the instant of the peak of the bandwidth. On the other hand, at the time 502, the transmission of an INTRA coincides, according to the predictive model, with the minimum of the transmission bandwidth. For a constant video quality, there is then a risk of the INTRA image transmitted starting at the time 502 arriving too late and causing a temporal offset by arriving after the theoretical time of use of that image, 506.

In accordance with the present invention, instead of coding the image transmitted at time 502 in INTRA mode, an image transmitted during the bandwidth peak is coded in INTRA mode. In FIG. 5, this is the preceding image, thus coded in INTRA mode and transmitted starting at the time 503. The transmission of the image coded in INTRA mode thus coincides with the peak of the bandwidth. On account of this, the image has a higher probability of arriving in time and of being displayed at the right moment 506.

Figure 6:
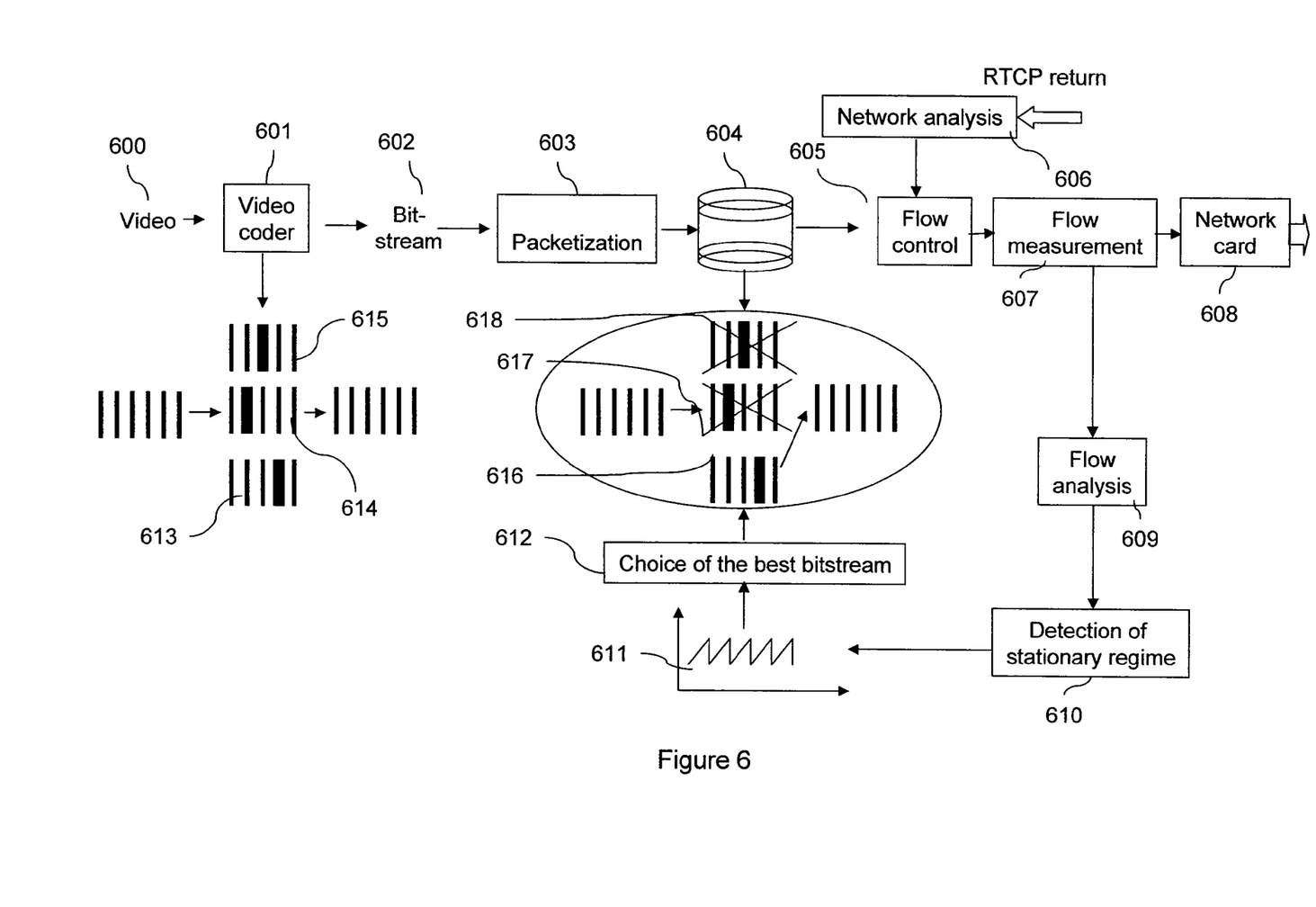
FIG. 6 represents, in the form of a block diagram, a first particular embodiment of the method and device of the present invention.

FIG. 6 describes a particular embodiment of the method of the present invention, in a hybrid form representing functions and signals implemented by these functions. A video 600 transmitted to a coder 601 of MPEG type is coded. This video is coded in several forms 613, 614, 615 in which the position of the image coded in INTRA mode differs.

Figure 7:
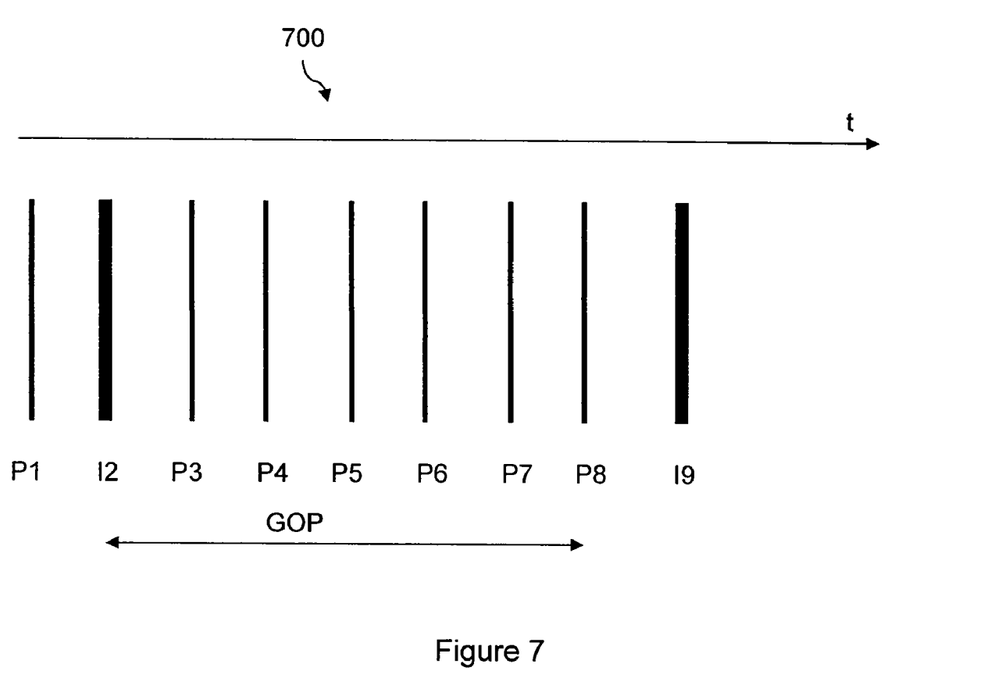
FIG. 7 is a diagrammatic illustration, in signal form, of the coding of a group of successive images.

FIG. 7 gives a reminder of an image group structure 700, known by the name "group of pictures" or "GOP". A GOP is composed of an INTRA image and images coded in INTER ("P" or "B" images in MPEG terminology). In FIG. 7, the group of pictures comprises seven images, denoted I2 and P3 to P8, the images of which the reference starts with "P" being coded in INTER mode and the images of which the reference starts with the letter "I" being coded in INTRA mode. The INTRA image I2 is coded independently of the other images whereas the INTER images P3 to P8 are coded by reference to one image ("P"image) or several other images ("B" images) of the GOP. In FIG. 7, no "B"image is represented.

In the form of coding 615, the images "1" and "2" of a group of pictures are coded in INTER, the image "3" in INTRA and the images "4" and "5" in INTER. In the form of coding 614, the images "1", "2" and "3" are coded in INTER mode, the image "4" in INTRA mode and the image "5" again in INTER mode. In the form of coding 613, the image "1" is coded in INTER mode, the image "2" in INTRA mode and the images "3", "4" and "5" in INTER mode. In each of the forms of coding, the following image, with index "6", is coded in INTER by taking the corresponding image "5" as prediction image. Three bitstreams 602 are thus constructed when the end of a GOP is reached, then packetized at 603 and inserted into the buffer memory 604. In preferential variants, when the image to code is situated far from an INTRA image, a single bitstream 602 is created, packetized at 603 and inserted into a buffer memory 604.

Simultaneously, that buffer memory 604 is emptied at a speed dictated by the flow control module 605. This module 605 implements, for example, a TCP or TFRC protocol and may take into account the module 606 for analyzing the network through the RTCP packets for example.

The measurement of flow is carried out at 607, before sending the images over the network, via of a network card 608, and is analyzed at 609. If a stationary regime is detected at 610 and 611, an algorithm 612 chooses, from the buffer memory 604, the packets corresponding to the bitstream such that the transmission of the INTRA image of the bitstream corresponds to the peak of the bandwidth, as illustrated at the time 503, in FIG. 5. If several bitstreams are available, the one of which the INTRA image coincides best with the bandwidth peak of the bandwidth model is selected. Coinciding with the peak of the bandwidth means that the transmission of the INTRA image terminates before the bandwidth drops again and as close a possible to that drop. To do this, the stationary regime is thus analyzed at 611 and the mean bandwidth is calculated to know the time of flow of each of the images of the bitstreams 616, 617 and 618 corresponding to the forms of coding respectively 613, 614 and 615.

For example, the bitstream which coincides best is the bitstream 616. It is then extracted from the buffer memory 604, to be transmitted, whereas the bitstreams 617 and 618 are deleted from the buffer memory 604.

Figure 8:
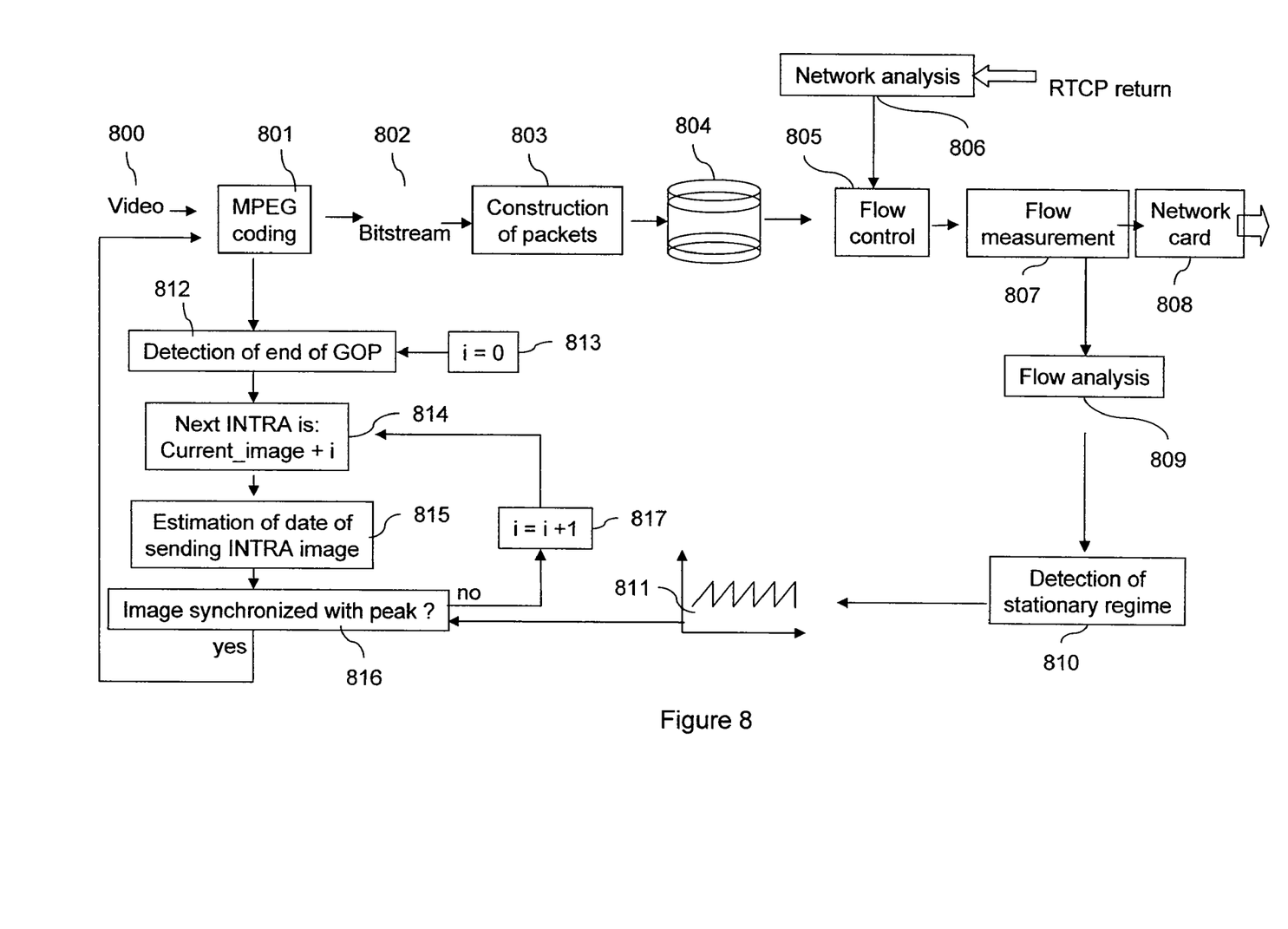
FIG. 8 represents, in the form of a block diagram, a second particular embodiment of the method and device of the present invention.

FIG. 8 describes, diagrammatically, another particular embodiment of the method of the present invention, in which instead of generating several bitstreams at the video coder, a single bitstream is generated. A video 800 is sent to a video coder 801 of MPEG type, which forms a bitstream 802, which is then put into the form of packets by the function 803, which packets are stored in buffer memory 804. The functions 805 to 810 are respectively similar to the functions 605 to 610. Thus, as described with reference to FIG. 6, the speed of flow of the packets is analyzed at 807 and 809, to detect whether a stationary regime of the flow control algorithm exists. The main parameter of this stationary regime is the period between two peaks of the bandwidth. If a stationary regime is established, this period is stable, as represented at 811. In the case in which a stationary regime is detected, the structure of the GOP's of the video coder is analyzed at 812. If an end of GOP, which corresponds to the coding of a new image in INTRA mode, is predicted soon, the functional blocks 813 to 817 are used to see if it is possible to modify the position of the INTRA image to synchronize it with the peak of the stationary regime. To that end, a variable i is initialized to 0, by the function 813. At 814, it is assumed that the index of the current image is n, several values for the choice of INTRA image are tested by incrementing the value of the variable i, at 817. The value of i such that the image of index (n+i) corresponds to the peak of the bandwidth is selected at 816. To that end, the functional blocks 815 and 816 perform a test to determine whether the transmission time of the image (n+i) will coincide with a peak of the bandwidth. In simple manner, as a first approximation, it is possible merely to evaluate whether the sending of the image n+i is situated in a phase below or above the average bandwidth. In the first case, the creation of the image coded in INTRA mode is delayed and, in the second case, the creation of the image coded in INTRA mode is accepted.

In the first case, the current value of i is kept and the choice of the index of the image for a coding in INTRA mode is (n+i). In the second case, a value incremented by i is tested.

The MPEG coding, by the coder 801, is then made by coding the image of index n+i in mode INTRA.

It is noted that the choice of the value i may be carried out by taking into account the level of filling of the buffer memory 804. This is because, if the buffer memory 804 is partially filled and cannot be emptied rapidly, the flow time of the data kept in the buffer memory 804 and the temporal delay due to the filling of the buffer memory 804 are taken into account. In this case, the evolution of the bandwidth, represented at 811, calls for the stationary regime to be modeled with greater fidelity. The flow control module 805 evaluates the speed of flow of the data kept in the buffer memory on the basis of the parameters of the model and of the speed of filling of the buffer memory 804 by the modules for MPEG coding 801 and packetization 803. Depending on these parameters, the modules for measurement and analysis of the flow 807 and 809 define the times at which the INTRA image (n+i) will be taken by the flow control module.

Figure 9:
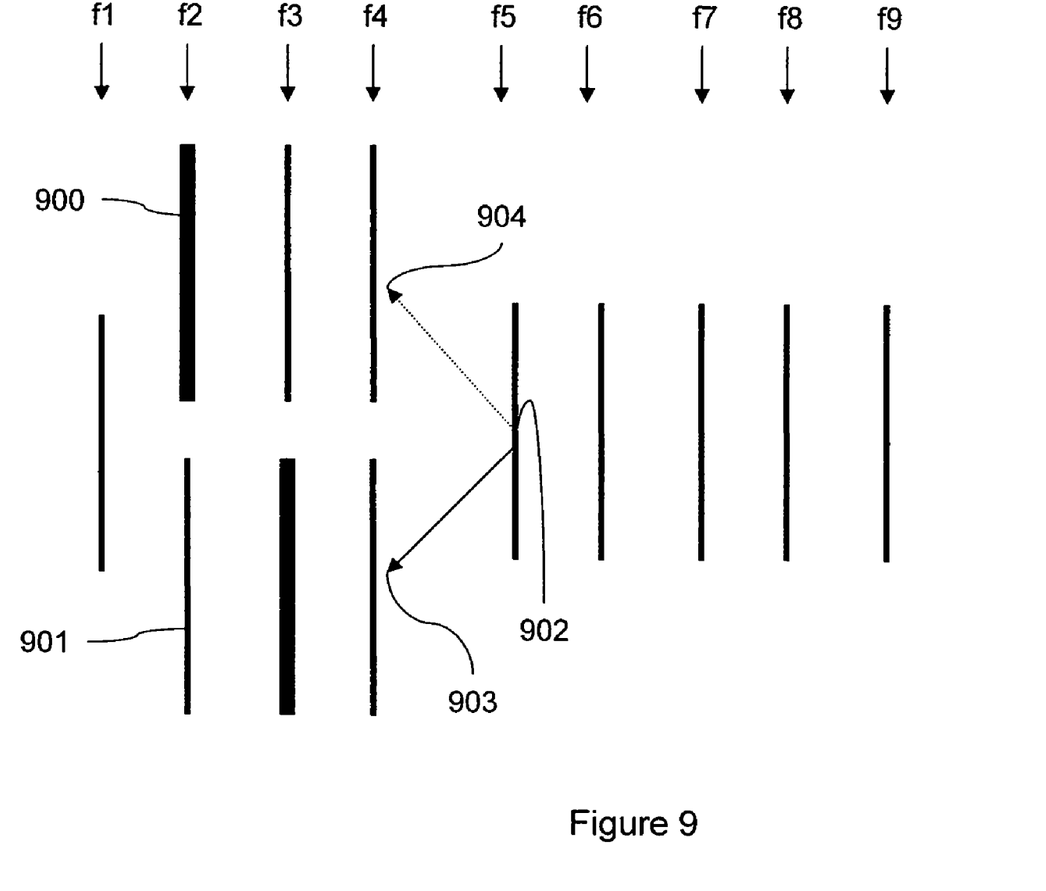
FIG. 9 represents, in signal form, a problem solved by a third embodiment of the method and device of the present invention.

It is noted that the first embodiment, illustrated in FIG. 6, has the advantage of choosing the INTRA image type just before its transmission over the network. On account of this, the choice of the image coded in INTRA is necessarily optimal in terms of synchronization of the transmission of the image coded in INTRA with the peak of the bandwidth. However, this choice is not always optimal in terms of compression quality, as set forth with respect to FIG. 9. In FIG. 9, when the end of a GOP approaches, in the embodiment described with reference to FIG. 6, several different bitstreams are generated. The images f2 to f4 are coded in two forms of bitstream. In the first form, the image f2 is coded in INTRA 900 whereas it is an image coded in INTER 901 in the second form. The same applies for the image f3 which is coded in INTRA and in INTER. On account of this, the image f4 differs slightly in terms of quality in the different bitstreams. When the image f5 902 is coded, use is made, as reference for the motion estimation module, of the preceding compressed/decompressed image of one of the two bitstreams, respectively 903 or 904. If the image of the bitstream 901 is chosen as reference image, the image f5 is optimized according to the bitstream 901. If the bitstream transmitted is the bitstream 900, a slight error, known by the term "drift" may appear starting with the image f5, at the time of the decoding and viewing on the client video.

Conversely, the embodiment illustrated in FIG. 8 is optimal in terms of video compression since a single bitstream is generated. However, this embodiment may not be optimal in terms of synchronization with the peak of the bandwidth. This is because, due to the fact that the buffer memory 804 cannot be empty and that the speeds of flow and filling must be modeled according to the model 811 and the estimated size of the images compressed by the coder 801, a small error may appear as to the choice of the INTRA image.

A third embodiment is intended to mitigate the slight drawbacks of the embodiments illustrated in FIGS. 6 and 8. This third embodiment is described in FIG. 10, which combines aspects of the two first embodiments. As was stated earlier, in the embodiment described in FIG. 6, three bitstreams are generated, at least over some portions of the video, that is to say at least in the vicinity of the end of a GOP. Then, preferentially, a single bitstream is constructed. This common bitstream follows on from a single one of the three bitstreams generated in the vicinity of the end of the GOP (images f5 to f9 in FIG. 9). On account of this, if the choice of the bitstream 612 is not that serving as reference for the common bitstream, a slight drift will appear on viewing the decoded video sequence. In theory, the probability of the bitstream serving as reference for the common bitstream being chosen is ⅓.

Figure 10:
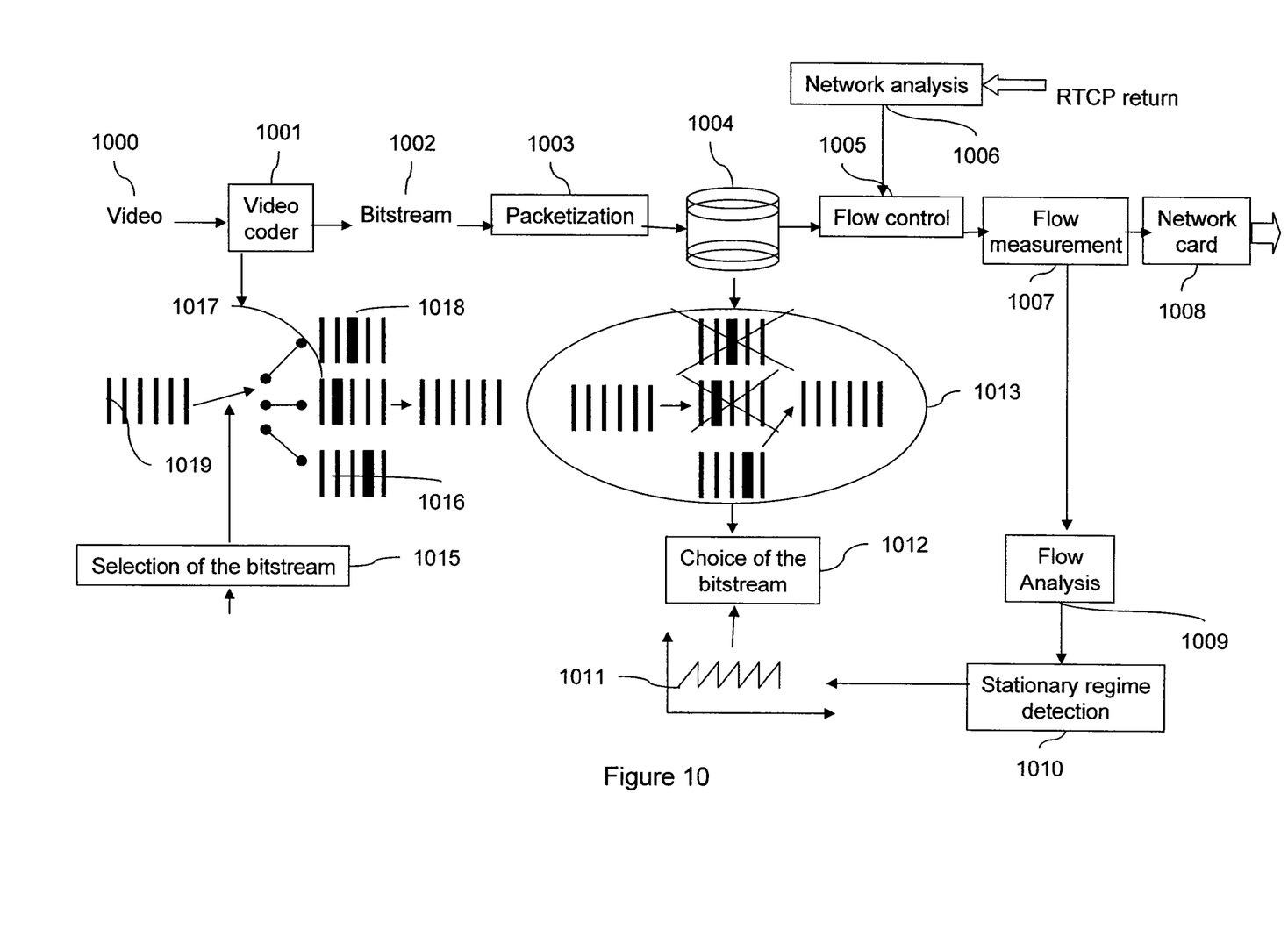
FIG. 10 represents, in the form of a block diagram, the third particular embodiment of the method and device of the present invention

The embodiment illustrated in FIG. 10 is directed to increasing this probability by applying, to the embodiment illustrated in FIG. 6, the choice for reference of the common bitstream, of the bitstream generated of which the probability of being chosen is the highest. Functions 1003 to 1010 are similar to functions 603 to 610 illustrated in FIG. 6.

A video 1000 is transmitted to a coder of MPEG type 1001 which codes it, that is to say compresses it, to form a bitstream 1002 stored in a buffer memory 1004. As in the embodiment described with reference to FIG. 6, when an end of a GOP is detected, three different bitstreams are generated. These three bitstreams 1016, 1017 and 1018 correspond to three different positions of the image coded in INTRA. When the video is re-coded in the form of a single bitstream, the common bitstream 1019 makes reference to one of the three bitstreams. In this case, at 1015, the operation of the second embodiment (see FIG. 8) is simulated to estimate, from among those three bitstreams, which one has the highest probability of being the one whose INTRA image will be synchronized with a peak of the modeled bandwidth. It is this bitstream which serves as reference for the coding of the next images of the video. If for example the bitstream 1018 is chosen as being the one for which the INTRA image coincides best with the peak of the bandwidth, then three bitstreams are generated but when the common part 1019 of the video is compressed, it takes the chosen bitstream 1018 as reference bitstream.

The algorithm is then the same as that described with reference to FIG. 6 with, at 1012, the choice being made of the bitstream which carries out the transmission of the INTRA image best synchronized with the peak of the bandwidth. On account of the test 1015, the probability of choosing the bitstream which does not serve as reference for the common bitstream is low.

Figure 11:
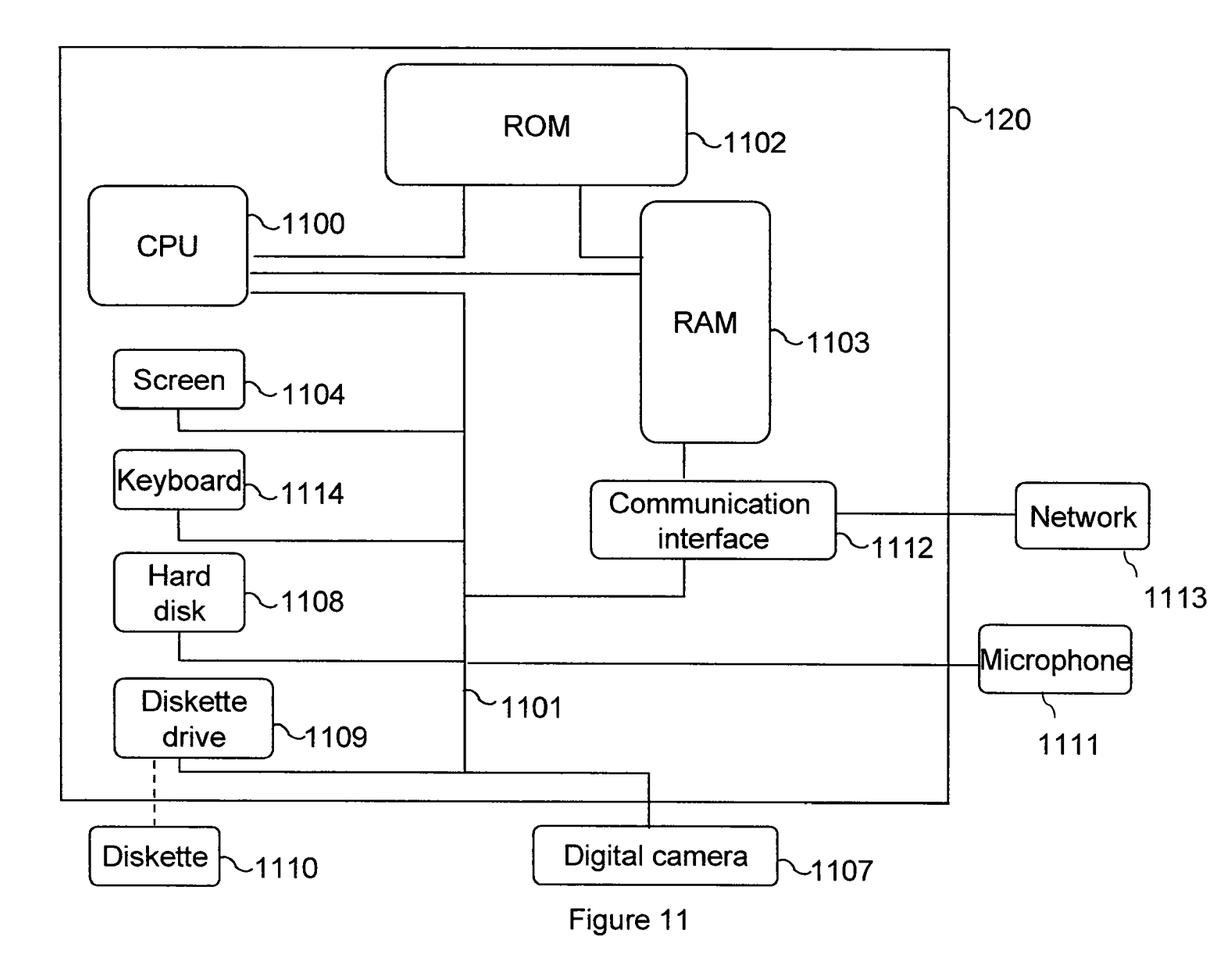
FIG. 11 is a diagrammatic representation of a device of the present invention.

As represented in FIG. 11, a device implementing the invention is for example a microcomputer 120 connected to different peripherals, for example a digital camera 1107 (or any image acquisition or storage means) connected to a graphics card and supplying information to be processed according to the invention. The device 120 could also be a digital camera connected to a network for example a video surveillance camera.

The device 120 comprises a communication interface 1112 connected to a network 1113 able to transmit digital data to be processed or, conversely, to transmit data processed by the device. The device 120 optionally comprises a storage means 1108 such as a hard disk or a drive 1109 for a disk 1110. This disk 1110 may for example be a diskette, a CD-ROM, or a DVD-ROM. The storage means 1108 may contain data processed according to the invention as well as each program participating in the implementation of the method of the present invention, which program, once read by the device 120, is stored by the storage means 1108. According to a variant, the program enabling the device to implement the method of the present invention is stored in read only memory 1102 (termed "ROM", acronym for "read only memory" in FIG. 11).

In a variant, the program is received in order to be stored in an identical manner to that described previously, via the communication network 1113.

The device 120 is, optionally, connected to a microphone 1111. The data to be processed according to the invention are, in this case, audio signal or include audio signal.

This same device 120 optionally has a screen 1104 for displaying the data to be processed or serving as an interface with the user, who can thus parameterize certain processing modes, using the keyboard 1114 or any other means (a mouse for example).

The central processing unit 1100 (termed "CPU", acronym for "central processing unit", in FIG. 11) executes the instructions relative to the implementation of the method of the present invention, which instructions are stored in the read only memory 1102 or by the storage means 1108. On powering up, the processing programs stored in a non-volatile memory, for example the ROM 1102, are transferred into the random access memory RAM 1103, which then contains the executable code of the invention, as well as registers for storing the variables necessary for implementing the invention.

More generally, an information storage means, which can be read by a computer or microprocessor, integrated or not into the device, and which may possibly be removable, stores a program implementing the method of respectively coding, transmission and decoding.

The communication bus 1101 enables communication between the different elements included in the microcomputer 120 or connected to it. The representation of the bus 1101 is not limiting and, in particular, the central processing unit 1100 is able to communicate instructions to any element of the microcomputer 120 directly or via another element of the microcomputer 120.

The invention claimed is:

1. A method of transmission of a datastream representing a sequence of images over a network in which a quantity of information that may be sent per unit of time varies substantially cyclically, said transmission extending over a plurality of cycles, that comprises:
a step of determining times for which a greater than average quantity of information may be sent per unit of time over the network, on the basis of the substantially cyclical past variation in said quantity of information that may be sent per unit of time and
a step of sending over said network, at said times, images corresponding to a greater quantity of information than the average quantity of information of the images in the sequence of images.

2. A method according to claim 1, wherein, during the determining step, a period of cyclical variation of the quantity of information that may be sent per unit time over the network is determined.

3. A method according to claim 1, wherein, during the determining step, extrema of the quantity of information that may be sent per unit time over the network are determined.

4. A method according to claim 1, wherein, during the determining step, a quantity of information kept in a memory and remaining to be transmitted over the network is determined.

5. A method according to claim 1, wherein, during the step of sending images, an image is selected for encoding with a compression rate lower than the compression rate of surrounding images, the sequence of images being transmitted in chronological order, such that the transmission of the image encoded with the lower compression rate, over the network, corresponds to a time for which the quantity of information that may be sent per unit of time over the network is greatest.

6. A method according to claim 1, wherein, during the sending step, a step is carried out of coding at least one image with a plurality of coding modes representing the at least one image by different quantities of information.

7. A method according to claim 1, wherein, during the sending step, a step is carried out of coding a same succession of a plurality of images into a plurality of bitstreams, each bitstream representing the same succession of the plurality of images with a respectively different image encoded at a lower compression rate than the other images of said same succession of the plurality of images.

8. A method according to claim 7, wherein, during the sending step, the bitstream for which the image encoded at the lower compression rate corresponds to a time for which the quantity of information that may be sent per unit of time over the network is greatest is transmitted.

9. A method according to claim 1, wherein, during the sending step, a transmission time is determined for each image of a plurality of images, and an image with a transmission time corresponding to a time for which the quantity of information that may be sent per unit time over the network is greatest is selected to be encoded at a lowest compression rate.

10. A method according to claim 1, wherein, during the sending step, an estimate is made of images among the sequence of images which must be coded at a lower compression rate than the other images of said sequence of images and a plurality of bitstreams is constituted taking that estimate into account.

11. A device for transmission of a datastream representing a sequence of images over a network in which a quantity of information that may be sent per unit of time varies substantially cyclically, said transmission extending over a plurality of cycles, that comprises:
means for determining times for which a greater than average quantity of information may be sent per unit of time over the network, on the basis of the substantially cyclical past variation in said quantity of information that may be sent per unit of time and
means for sending over said network, at said times, images corresponding to a greater quantity of information than the average quantity of information of the images in the sequence of images.

12. A removable or non-removable, non-transitory, computer or microprocessor readable medium, storing instructions of a computer program, which, when executed by a processor, enables the processor to implement the method of transmitting images according to claim 1.

* * * * *